United States Patent [19]

Cusic et al.

[11] 3,855,295

[45] Dec. 17, 1974

[54] 6-[SPIRO-4'-(OPTIONALLY SUBSTITUED AMINO) CYCLOHEXYL]-1,1a,6,10b-TETRAHYDRODIBENZO[a,e]CYCLOPROPA[c]CYCLOHEPTENES

[75] Inventors: John W. Cusic, Skokie; Charles R. Ellefson, Chicago, both of Ill.

[73] Assignee: G. D. Searle & Co., Chicago, Ill.

[22] Filed: June 15, 1973

[21] Appl. No.: 370,462

[52] U.S. Cl.............. 260/570.5 CA, 260/562 P, 260/566 A, 424/330
[51] Int. Cl............................................ C07c 87/40
[58] Field of Search .................... 260/570.5 CA

[56] References Cited
UNITED STATES PATENTS

| 3,449,427 | 6/1969 | Kaiser et al.................. 260/570.8 |
| 3,574,199 | 4/1971 | Coyne et al.................. 260/240 |
| 3,723,420 | 3/1973 | Dvolaitzky et al............ 260/240 TC |

*Primary Examiner*—G. Thomas Todd
*Attorney, Agent, or Firm*—Elliot N. Schubert

[57] ABSTRACT

6-[Spiro-4'-(optionally substituted amino)-cyclohexyl]-1,1a,6,10b-tetrahydrodibenzo[a,e]cyclopropa-[c]cycloheptenes, manufactured by processes utilizing 1,1a,6,10b-tetrahydrodibenzo[a,e]cyclopropa[c]cycloheptene-6-one as the starting material, exhibit valuable pharmacological, e.g. anti-depressant, activity.

6 Claims, No Drawings

6-[SPIRO-4'-(OPTIONALLY SUBSTITUTED AMINO) CYCLOHEXYL]-1,1a,6,10b-TETRAHYDRODIBENZO [a,e]CYCLOPROPA[c]CYCLOHEPTENES

The present invention is concerned with novel pentacyclic organic compounds characterized by a spirocyclohexyl ring and, more particularly, with 6-[spiro-4'-(optionally substituted amino)cyclohexyl]-1,1a,6,10b-tetrahydrodibenzo[a,e]cyclopropa[c]cycloheptenes of the following structural formula

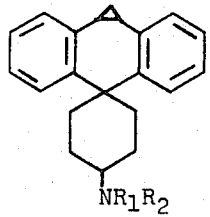

wherein $R_1$ and $R_2$ are selected from the group consisting of hydrogen and lower alkyl radicals.

The lower alkyl radicals encompassed by that formula are typified by methyl, ethyl, propyl, butyl, pentyl, heptyl, hexyl and the branched-chain radicals isomeric therewith.

The compounds of the present invention are manufactured by a variety of processes which proceed through the common intermediate, 6-(spiro-4'-oxocyclohexyl)1,1a,6,10b-tetrahydrodibenzo[a,e]cyclopropa[c]cycloheptene. That novel intermediate is obtained by a series of steps utilizing, as the starting material, 1,1a,6,10b-tetrahydrodibenzo[a,e]cyclopropa[c]cyclohept-6-one, the preparation of which is described in U.S. Pat. No. 3,574,199, issued Apr. 6, 1971. The latter substance is thus contacted with the Grignard reagent prepared from chloromethyl methyl ether to afford 6-methoxymethyl-1,1a,6,10b-tetrahydrodibenzo[a,e]cyclopropa[c]cyclohepten-6-ol. Conversion of that substance to 6-formyl-1,1a,6,10b-tetrahydrodibenzo[a,e]cyclopropa[c]cycloheptene is effected by warming with formic acid. The latter aldehyde is allowed to react with methyl vinyl ketone in the presence of an alkaline condensing agent such as potassium ethoxide to afford 6-(spiro-4'-oxocyclohex-2'-enyl)-1,1a,6,10b-tetrahydrodibenzo[a,e]cyclopropa[c]cycloheptene. Reduction of the 2'-double bond, suitably by catalytic hydrogenation using a palladium-on-carbon catalyst, produces 6-(spiro-4'-oxocyclohexyl)-1,1 a,6,10b-tetrahydrodibenzo[a,e]cyclopropa[c]cycloheptene.

When it is desired to produce the 4'-dialkylaminocyclohexyl compounds of this invention, the aforementioned intermediate is reductively aminated by heating with a secondary amine and formic acid. The reaction of 6-(spiro-4'-oxocyclohexyl)-1,1a,6,10b-tetrahydrodibenzo[a,e]cyclopropa[c]cycloheptene with formic acid and dimethylamine thus produces 6-(spiro-4'-dimethylaminocyclohexyl)-1,1a,6,10b-tetrahydrodibenzo[a,e]cyclopropa[c]cycloheptene.

The instant 4'-monoalkylaminocyclohexyl derivatives are preferably produced by contacting the 4'-oxocyclohexyl intermediate with an alkyl ammonium formate to afford the 4'-N-alkylformamido derivative, which is then cleaved with a dimethyl sulfoxide/hydrochloric acid mixture, thus affording the desired 4'-monoalkylcyclohexyl derivative. Typically, 6-(spiro-4'-oxocyclohexyl)-1,1a,6,10b-tetrahydrodibenzo[a,e]cyclopropa[c]cycloheptene is heated with methyl ammonium formate to yield 6-[spiro-4'-(N-methylformamido)cyclohexyl]-1,1a,6,10b-tetrahydrodibenzo[a,e]cyclopropa[c]cycloheptene, which is heated with a dimethyl sulfoxide/concentrated hydrochloric acid solution to produce 6-(spiro-4'-methylaminocyclohexyl)-1,1a,6,10b-tetrahydrodibenzo[a,e]cyclopropa[c]cycloheptene.

Manufacture of the instant 4'-aminocyclohexyl derivative is accomplished by converting the 4'-oxocyclohexyl intermediate to the corresponding oxime, then reducing the latter substance. Thus, 6-(spiro-4'-oxocyclohexyl)-1,1a,6,10b-tetrahydrodibenzo[a,e]cyclopropa[c]cycloheptene is heated with hydroxylamine hydrochloride and pyridine to afford 6-(spiro-4'-oxocylohexyl)-1,1a,6,10b-tetrahydrodibenzo[a,e]cyclopropa[c]cycloheptene oxime and that oxime is contacted with lithium aluminum hydride to afford 6-(spiro-4'-aminocyclohexyl)-1,1a,6,10b-tetrahydrodibenzo[a,e]cyclorpopa[c]cydloheptene.

Equivalent to the instant amines for the purposes of this invention are the corresponding pharmaceutically acceptable non-toxic acid addition and quaternary salts. Typical examples are the hydrochloride, hydrobromide, phosphate, sulfate, citrate, tartrate, lactate, maleate, succinate, cinnamate, acetate, benzoate, ascorbate, gluconate, methobromide, methochloride, ethobromide, etc.

The compounds of the present invention exhibit valuable pharmacological properties. They are, for example, anti-depressant agents, as is illustrated by their ability to antagonize the effects of reserpine-like substances. That property is illustrated by the activity of these compounds in the following standard assay:

To a group of 5 mice weighing 20–30 grams is administered, intragastrically, a dose of 25 mg./kg. of the test compound. There is then administered intraperitoneally, one hour later, 20 mg./kg. of 2-hydroxy-2-ethyl-3-isobutyl-9,10-dimethoxy-1,2,3,4,6,7-hexahydro-11bH-benzo[a]quinolizine, a synthetic compound with reserpine-like activity. That dose of the reserpine-like compound produces essentially complete ptosis in the animals one-half hour after administration. A compound is rated active if it produces a significant (p .05) antagonism of ptosis as evidenced by the Wilcoxon Rank Sum method. Ptosis is rated using the method of Rubin et al., J. Pharmacol., 120, 125 (1957).

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees Centigrade (°C.) and quantities of materials in parts by weight unless otherwise noted.

EXAMPLE 1

To a mixture of 2 parts of magnesium turnings with 10 parts by volume of tetrahydrofuran is added 0.001 part of mercuric chloride. After a few minutes a solution of 2 parts of chloromethyl methyl ether dissolved in 20 parts by volume of tetrahydrofuran is added dropwise, keeping the temperature at about −10°. After the addition is complete the mixture is stirred for about 15 minutes and a solution of 1 part of 1,1a,6,10b-tetrahydrodibenzo'[a,e]cyclopropa[c]cyclohepten-6-one in 10 parts by volume of tetrahydrofuran is added slowly. The resulting reaction mixture is stirred at room temperature for about 2 hours, then is warmed at about 50° for approximately 30 minutes. Cold aqueous ammonium chloride is added to decompose the reaction mixture, which is then extracted with ether. The ether extracts are combined, washed with water, dried over anhydrous magnesium sulfate and stripped of solvent under reduced pressure to afford 6-methoxymethyl-1,1a,6,10b-tetrahydrodibenzo[a,e]cyclopropa[c]cyclohepten-6-ol, characterized by the following structural formula

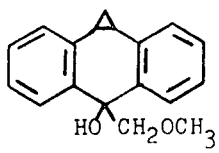

A solution containing 1 part of 6-methoxymethyl-1,1a,6,10b-tetrahydrodibenzo[a,e]cyclopropa[c]cyclohepten-6-ol in 2 parts by volume of 98% formic acid is stirred at approximately 50° for about 10 minutes, at the end of which time 0.05 part of 0.1 N sulfuric acid is added and the resulting mixture is cooled to room temperature. The cooled mixture is poured slowly into 10 parts of ice water containing 0.05 part of 1 N sulfuric acid and that mixture is stirred for about 2 hours. Extraction of that mixture with ether affords an organic solution, which is dried over anhydrous magnesium sulfate and concentrated to dryness under reduced pressure, thus affording 6-formyl-1,1a,6,10b-tetrahydrodibenzo[a,e]cyclopropa[c]cycloheptene, which compound is characterized by the following structural formula

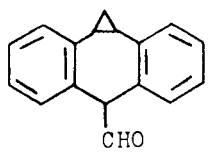

To a solution containing 1 part of 6-formyl-1,1a,6,10b-tetrahydrodibenzo[a,e]cyclopropa[c]cycloheptene, 1.25 parts of methyl vinyl ketone and 5 parts by volume of tetrahydrofuran, in a nitrogen atmosphere, is added, at approximately 10°, 0.35 part by volume of 10% ethanolic potassium ethoxide. The resulting reaction mixture is allowed to warm to room temperature, then is stirred for about 3 hours. At the end of that time the mixture is diluted with ether, then treated with water and dilute hydrochloric acid. The ether solution is separated, washed with water, dried over anhydrous magnesium sulfate and evaporated to dryness under reduced pressure to afford 6-(spiro-4'-oxocyclohex-2'-enyl)-1,1a,6,10b-tetrahydrodibenzo[a,e]cyclopropa[c]cycloheptene. This compound is represented by the following structural formula

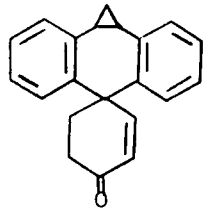

To a solution of 1 part of 6-(spiro-4'-oxocyclohex-2'-enyl)-1,1a,6,10b-tetrahydrodibenzo[a,e]cyclopropa[c]cycloheptene in 10 parts of glacial acetic acid is added 0.2 part of 5% palladium-on-carbon catalyst and the resulting reaction mixture is shaken with hydrogen at atmospheric pressure and room temperature until one molecular equivalent of hydrogen has been absorbed. The catalyst is removed by filtration and the filtrate is concentrated to dryness under reduced pressure. The resulting residue is diluted with water, then extracted with ether. The ether extracts are separated, washed successively with dilute aqueous sodium hydroxide and water, dried over anhydrous magnesium sulfate and stripped of solvent under reduced pressure to afford 6-(spiro-4'-oxocyclohexyl)-1,1a,6,10b-tetrahydrodibenzo[a,e]cyclopropa[c]cycloheptene, represented by the following structural formula

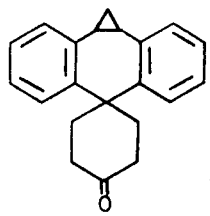

EXAMPLE 2

A mixture consisting of 1 part of 6-(spiro-4'-oxocyclohexyl)-1,1a,6,10b-tetrahydrodibenzo[a,e]cyclopropa[c]cycloheptene, 10 parts of dimethylamine, 2 parts of formic acid and 10 parts of dimethylformamide is heated at the reflux temperature for about 4 hours. At the end of that time the reaction mixture is cooled and diluted with ether. The organic solution is extracted with dilute hydrochloric acid and the acidic extract is made alkaline by the addition of aqueous sodium hydroxide. That alkaline mixture is extracted with ether and the ether solution is stripped of solvent under reduced pressure to afford 6-(spiro-4'-dimethylaminocyclohexyl)-1,1a,6,10b-tetrahydrodibenzo[a,e]cyclopropa[c]cycloheptene. This compound is represented by the following structural formula

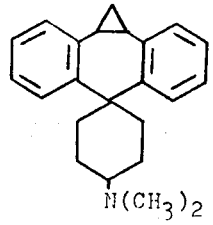

EXAMPLE 3

To a suspension of 1 part of 6-(spiro-4'-oxocyclohexyl)-1,1a,6,10b-tetrahydrodibenzo[a,e]cyclopropa[c]cycloheptene in 5 parts of dimethylformamide is added methyl ammonium formate (prepared from 2 parts by volume of methylamine and 0.4 part by volume of formic acid) and the resulting reaction mixture is heated at the reflux temperature for about 5 hours. The reaction mixture is then diluted with benzene and washed successively with dilute hydrochloric acid and water. Drying of that organic solution over anhydrous magnesium sulfate followed by removal of the solvent under reduced pressure affords 6-[spiro-4'-(N-methylformamido)cyclohexyl]-1,1a,6,10b-tetrahydrodibenzo[a,e]cyclopropa[c]cycloheptene, represented by the following structural formula

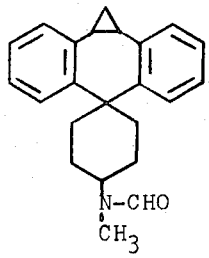

A mixutre containing 1 part of 6-[spiro-4'-(N-methylformamido)cyclohexyl]-1,1a,6,10b-tetrahydrodibenzo[a,e]cyclopropa[c]cycloheptene with 15 parts by volume of 5:1 dimethyl sulfoxide/concentrated hydrochloric acid is heated at approximately 100° for about 3 hours, at the end of which time the solvent is removed by distillation under reduced pressure. The resulting residue is dissolved in water, then is washed with ether and made alkaline by the addition of aqueous sodium hydroxide. That mixture is extracted with ether and the ether extract is washed with water, dried over anhydrous magnesium sulfate concentrated to dryness under reduced pressure to afford 6-(spiro-4'-methylaminocyclohexyl-1,1a,6,10b-tetrahydrodibenzo[a,e]cyclopropa[c]cycloheptene, which compound is represented by the following structural formula

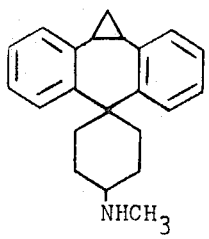

EXAMPLE 4

A mixture consisting of 1 part of 6-(spiro-4'-oxocyclohexyl)-1,1a,6,10b-tetrahydrodibenzo[a,e]cyclopropa[c]cycloheptene, 1 part of hydroxylamine hydrochloride and 10 parts of pyridine is heated at the reflux temperature for about 2 hours. At the end of that time the reaction mixture is poured into water and the resulting precipitate is collected by filtration, washed with water and dried to afford 6-(spiro-4'-oxocyclohexyl)-1,1a,6,10b-tetrahydrodibenzo[a,e]cyclopropa[c]cycloheptene oxime, characterized by the following structural formula

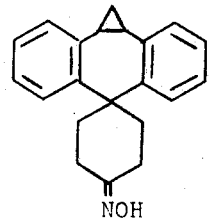

To a rapidly stirred mixture of 1 part of 6-(spiro-4'-oxocyclohexyl)-1,1a,6,10b-tetrahydrodibenzo[a,e]cyclopropa[c]cycloheptene oxime in 100 parts by volume of ether is added portionwise 0.5 part of lithium aluminum hydride. The resulting reaction mixture is stirred and heated at the reflux temperature for about 4 hours, then is cooled to approximately 0° and decomposed by the addition of 2 parts of water and 1 part of 25% aqueous sodium hydroxide. The precipitated salts are removed by filtration and the organic filtrate is treated with anhydrous hydrogen chloride. The solid which separates is collected by filtration, washed with ether and dried to yield 6-(spiro-4'-aminocyclohexyl)-1,1a,6,10b-tetrahydrodibenzo[a,e]cyclopropa[c]cycloheptene hydrochloride, which compound is represented by the following structural formula

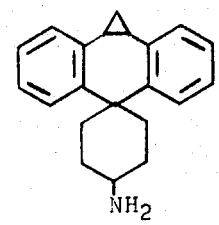

EXAMPLE 5

When an equivalent quantity of diethylamine is substituted for dimethylamine in the procedure of Example 2, there is produced 6-(spiro-4'-diethylaminocyclohexyl)-1,1a,6,10b-tetrahydrodibenzo[a,e]cyclopropa[c]cycloheptene.

EXAMPLE 6

The substitution of an equivalent quantity of ethyl ammonium formate for methyl ammonium formate in the procedure of Example 3 results in 6-[spiro-4'-(N-methylformamido)cyclohexyl]-1,1a,6,10b-tetrahydrodibenzo[a,e]cyclopropa[c]cycloheptene, which compound is converted to 6-(spiro-4'-ethylaminocyclohexyl)-1,1a,6,10b-tetrahydrodibenzo[a,e]cyclopropa[c]cycloheptene by the subsequent procedure described in that Example.

What is claimed is:
1. A compound of the forumla

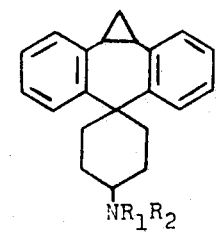

wherein $R_1$ and $R_2$ are selected from the group consisting of hydrogen and lower alkyl radicals.

2. As in claim 1, a compound of the formula

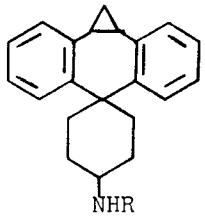

wherein R is a lower alkyl radical.

3. As in claim 1, a compound of the formula

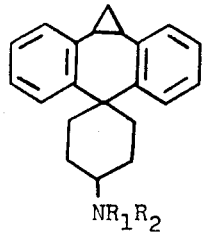

wherein $R_1$ and $R_2$ are lower alkyl radicals.

4. As in claim 1, the compound which is 6-(spiro-4'-aminocyclohexyl)-1,1a,6,10b-tetrahydrocibenzo[a,e]cyclopropa[c]cycloheptene.

5. As in claim 1, the compound which 6-(spiro-4'-methlyaminocyclohexyl)-1,1a,6,10b-tetrahydrodibenzo[a,e]cyclopropa[c]cycloheptene.

6. As in claim 1, the compound which is 6-(spiro-4'-dimethylaminocyclohexyl)-1,1a,6,10b-tetrahydrodibenzo[a,e]cyclopropa[c]cycloheptene.

* * * * *